July 20, 1937.  C. V. GLUTZ  2,087,510

SCALE

Filed Dec. 16, 1935  2 Sheets-Sheet 1

INVENTOR
Charles V. Glutz
BY
ATTORNEY

July 20, 1937.  C. V. GLUTZ  2,087,510
SCALE
Filed Dec. 16, 1935  2 Sheets-Sheet 2
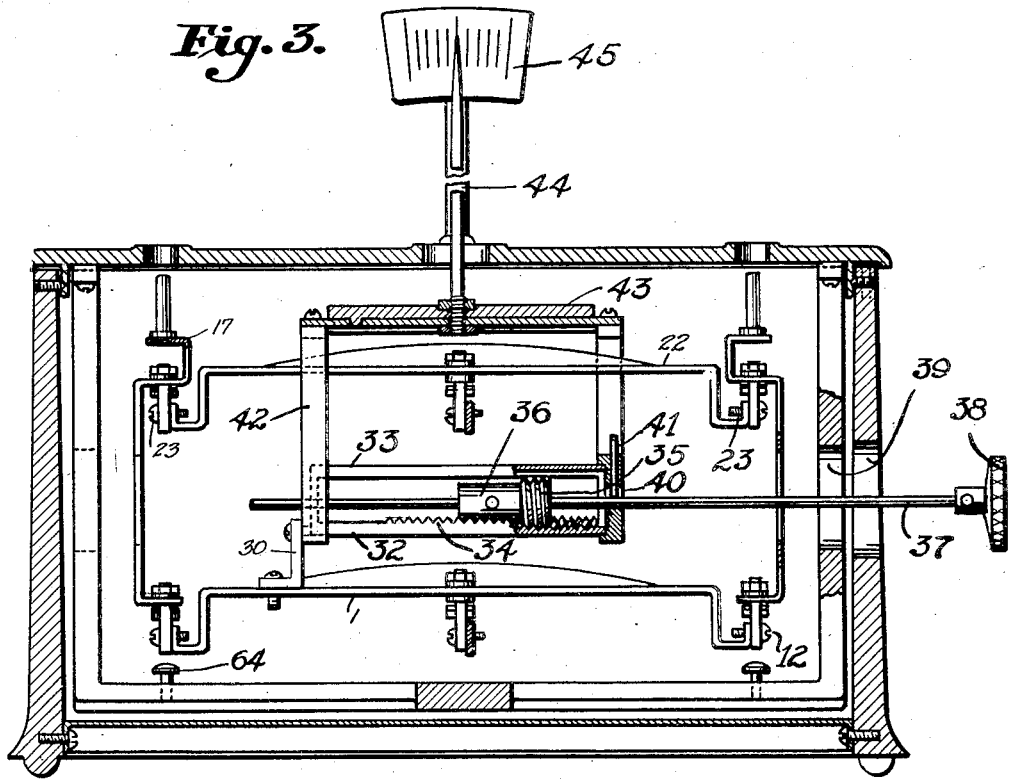
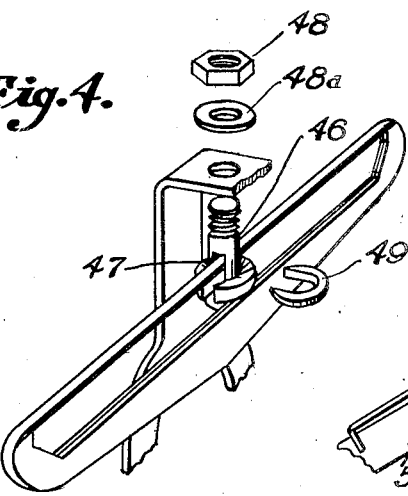
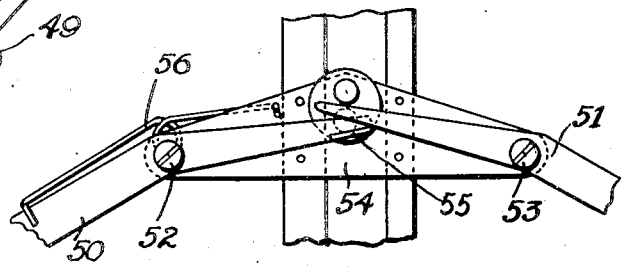
INVENTOR
Charles V. Glutz
BY
ATTORNEY Patented July 20, 1937

2,087,510

UNITED STATES PATENT OFFICE 2,087,510

SCALE

Charles V. Glutz, St. Paul, Minn.

Application December 16, 1935, Serial No. 54,605

8 Claims. (Cl. 265—54)

My invention relates to improvements in scales, particularly in that type of scale that is used for weight testing of cream or milk, as in creamery and testing stations, etc.

In this type of scale there is the necessity for extreme accuracy and ease and delicacy of adjustment.

Among the features of my invention are improvements in the suspension means for the scale beam and for the weight elements; improvements in the balance mechanism, and improvements in the means for holding the scale beam and associated parts in locking position.

Through my improvements the accuracy and dependability of the scale is particularly improved and a scale for the purpose designed is obtained wherein it is particularly easy to maintain the same in accurate working condition.

These and other features of the invention will be more specifically set forth in the following description and the accompanying drawings, wherein:

Figure 3 is a sectional view on line 3—3 of Figure 1.

Figure 4 is a view in detail of one of the spring suspension elements forming a part of the invention; and Figure 5 is a view in detail of a locking mechanism for the scale beam.

Figure 1:
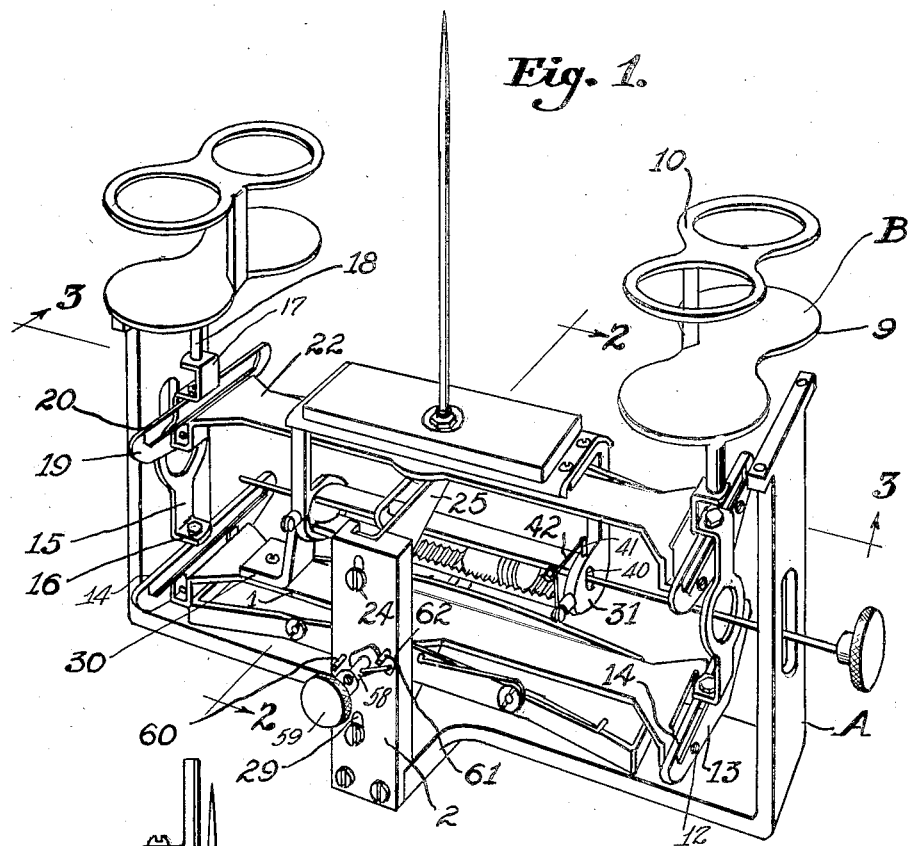
Figure 1 is a view in perspective of a scale embodying my features of invention with the enclosing casing removed.

Referring to the drawings in detail A represents a supporting framework for the scale mechanism. A scale beam 1 is centrally mounted in the framework in the following manner:

Projecting upwardly, centrally from one side of the base of the framework, is a frame member 2. Projecting inwardly from the lower end of the frame member 2 is an arm 3, preferably secured to the frame member as by a bolt 4. Pivotally supported by the arm 3 is a bar 5 having upturned ends 6. A flat spring strap 7 extends around the bar lengthwise thereof and spanning the space between the upturned end 6 of the bar to form a spring.

The scale beam 1 is centrally supported upon the spring strap 7 intermediate the ends 6 of the supporting bar 5, as by means of the lock nut mechanism 8. The connection of the lock nut mechanism 8 to the spring band forms the entire pivotal support for the scale beam.

B indicates holders for the bottles that contain the liquid to be weighed. These holders are each formed with a base plate 9 and supported ring plates 10 to receive the bottles. The holders B are supported upon the ends of the scale beam by the following described mechanism:

Secured upon the ends of the scale beam by bolts 12 are bars 13 with surrounding spring bands 14, said bars and bands being of the same construction and arrangement as the bars and surrounding bands 5 and 7 that centrally support the scale beam. Upwardly projecting bracket members 15 are supported by lock nut assemblies 16 centrally upon the bands 14. The upper ends of said bracket members are formed with bends 17 within which upper ends of the brackets supporting posts 18 for the holders B are swiveled. Supported underneath the upper bend ends 17 of the bracket members are bars 19 with surrounding springs 20 corresponding to the bars 13 and surrounding springs 14 and 5 and 7. The upper bend ends of the bracket members are connected centrally with the spring bands 20 as by lock nut assemblies as specifically shown in Fig. 4, said assembly being illustrated by the separated parts, including the bolt 46, washnuts 48 and 48a, and the cam washer 49. A beam 22 rigidly connects the opposed pair of bars 19, said beam 22 being at its ends bolted to said bars as by bolts 23. As will thus be evident there is a double band support upon the ends of the scale beam for each bottle holder by reason of the fact that each supporting bracket member 15 is supported upon the spring bands 14 and 20. These spring bands constitute the resilient support for the bottle holders. The beam 22 likewise has similar central spring support. The upper end of the frame member 2 supports by means of a bolt 24 the inwardly projecting arm 25. Said arm 25 carries a bar 26 with surrounding spring 27, the beam 22 being centrally supported upon said spring 27 by lock nut assembly 28. The supporting bolts 4 for the bar 5, and the supporting bolt 24 for the arm 25, are vertically adjusted by means of the slots 29 in the framework. Vertical adjustment for the scale beam 1 and the upper beam 22 is thereby secured. As will be noted the double spring support upon the ends of the scale beam is thus secured for each bottle holder, the scale beam having likewise a central, similar spring support, and the beam 22 also having a similar central spring support.

For the purpose of leveling the scale the following tare rod mechanism is provided: Supported from the scale beam 1 by brackets 30 are the heads 31 connected by upper and lower opposed plates 32 and 33. The plate 32 is on its inner face formed with threads 34 with which engage threads 35 of a weight 36. The weight 36 is carried by a tare rod 37 having at its outer end a handle 38, the tare rod extending outwardly through an opening 39 in the end members of the framework. In order that the weight may be lifted and moved independently of the screw engagement, one of the heads 31 is formed with a slotted opening 40 through which the tare rod passes. A pin 41 is normally held in engagement with the tare rod by a spring 42. Thus the handled end of the tare rod may be lifted, forcing upwardly the pin 41 and releasing the weight from the supporting plate 32, permitting the weight to be moved in either direction by the tare rod free of the threaded engagement. The heads 31 are formed with upwardly projecting arms 42 supporting at their upper ends a weighted bar 43. The weighted bar 43 carries a centrally, upwardly projecting pointer 44, the upper end of which pointer is positioned in front of a dial 45 which forms the indicating dial of the scale in the swinging of said pointer in the use of the scale.

The lock nut assemblies form the securing means to the different suspension spring bands and are of special construction and particularly illustrated in Figure 4. Figure 4 specifically shows one of the upper spring supports for the bottle holder. This lock nut assembly includes the bolt 46 formed with an opening 47 through which the strap spring passes and a tightening nut and washer 48 and 48a secured over the threaded end of the bolt. In order to tighten the assembly upon the spring I provide a cam washer 49 adapted to be positioned between the strap spring and the lower end of the bolt. This cam washer is outwardly tapered toward its periphery to bring about a desired clamping action.

For the purpose of locking the scale beam in fixed position I provide the following described mechanism: A pair of levers 50 and 51 have pivotal support 52 and 53 upon a cross bar 54 supported upon the inner side of the upright frame member 2. As shown in Figure 5 the lever 50 is formed at its inner end with an outwardly projecting flange 55 standing below the inner end of the lever 51. The inwardly bent outer ends of the lever arms 50 and 51 project underneath the ends of the scale beam. The lever arms 50 and 51 are normally held in inoperative position by springs 56. In order to depress the inner ends of the lever arms to bring the outer ends thereof into engagement with the scale beam I provide a cam roller 57 supported upon the inner end of a rod 58, the rod 58 extending through the vertical upright 2 of the framework and carrying a hand knob 59 at its outer end. In the position of the parts shown in Figure 5 the cam roller stands in a position to permit the levers 50 and 51 to be held by the springs 56 in an inoperative position. The turning of the supporting rod 58 of the cam roller will cause the roller to engage with and force the inner ends of the lever arms 50 and 51 downwardly, the cam roller engaging with the inner end of the lever 51 and the lever arm 51 in turn engaging with the flanged, inner arm of the lever 50.

Stops 60 and 61 are supported on the outer side of the frame member 2 to be engaged by the cross pin 62 carried by the cam roller rod 58. In the rotation of the rod one stop is engaged when the cam roller is in position to release the levers, and the other stop when the cam roller is in position to force the levers into locking engagement with the scale beam.

Figure 2:
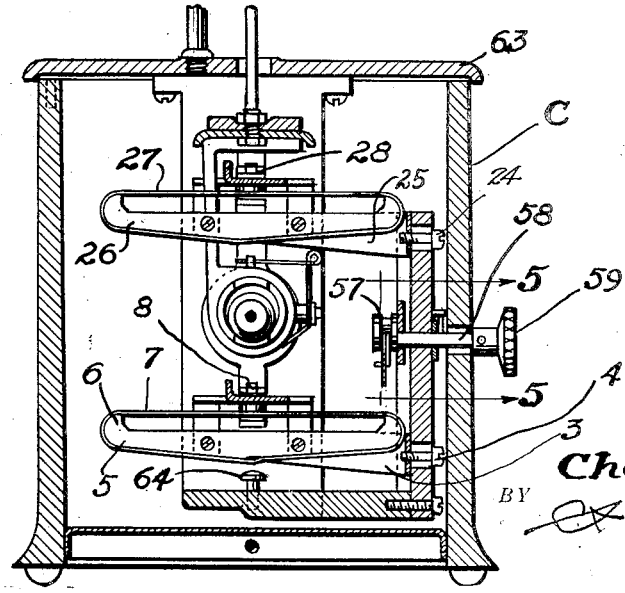
Figure 2 is a sectional view on the line 2—2 of Figure 1, with the parts shown in position within the casing.

The mechanism is enclosed in a suitable casing C having removable top 63. The dial 45, as shown, is supported by said top and the pointer 44 extends through an opening in said top. As shown in Figure 2 the rod 58 supporting the cam operating mechanism for the scale beam locking members projects through an opening in the side wall of the casing.

In order to limit the movement of the scale beam I provide stops 64 supported in the base of the casing underneath the ends of the scale beam.

There are a good many advantages over the ordinary constructions secured by my improvements. Through the independent band supports for the upper and lower beams and the plurality of band supports for the weight elements the parts may be relatively short with consequent strength and rigidity with the maximum protection against twisting. A particular form of clamping between the bands and supporting parts co-operates in attaining these advantages.

Another advantage lies in the method of support of the tare rod. The tare rod supports are anchored upon the scale beam and form a rigid anchoring for the weight element positioned above. The particular construction of tare rod with its spring releasability adapts itself particularly to accuracy of adjustment. I secure by the features of construction described and claimed one that it is particularly easy to repair and adjust and one that it is particularly easy to maintain in accurate weighing condition.

I claim:

1. In a scale of the class described comprising in combination with a framework, a spring band supported by said framework, a scale beam having central pivotal support upon said band, a pair of vertically spaced spring bands supported from each end of said beam, weighing elements centrally supported upon said upper pairs of spaced bands, a beam connection between said upper pairs of said bands, a tare rod extending longitudinally of said scale beam having threaded support thereon, and spring-pressed, releasable engaging means for said tare rod permitting said tare rod being released from its threaded support.

2. In a scale of the class described comprising in combination with a framework, a spring band supported by said framework, a scale beam having central pivotal support upon said band, a pair of vertically spaced spring bands supported from each end of said beam, weighing elements centrally supported upon said upper pairs of spaced bands, a beam connection between said upper pairs of spaced bands, a tare rod extending longitudinally of said scale beam and having threaded support thereon, and a weight member centrally supported from and above said tare rod support.

3. In a scale of the class described comprising in combination with a framework, a spring band supported by said framework, a scale beam having central pivotal support upon said band, a pair of vertically spaced spring bands supported from each end of said beam, weighing elements centrally supported upon said upper pairs of spaced bands, a beam connection between said upper pairs of spaced bands, a tare rod extending longitudinally of said scale beam having threaded support thereon, a weight member centrally supported from and above said tare rod support, an enclosing casing for said mechanism, a removable cover for said casing, a dial supported from and above said cover, and a pointer centrally supported by said weight member and projecting upwardly through said cover into association with said dial.

4. In a scale of the class described comprising in combination a framework, a scale beam and weighing elements, a spring band centrally supporting said scale beam and interconnected similar bands supporting said weighing elements, central supports upon said bands for said beam and weighing elements, each consisting of a bolt centrally embracing the spring band, locking means connecting said bolt and supported parts, and a washer surrounding said bolt in contact with said spring parts, said washer being outwardly tapered, for the purpose set forth.

5. In a scale of the class described comprising in combination a framework, a spring band supported by said framework, a scale beam having central support upon said band, said support consisting of a bolt centrally secured upon said band, interlocking engagement with said bolt and said band, and a washer encircling said bolt in contact with said band, said washer being outwardly tapered from said bolt, weighing elements and spring bands supported in the ends of said scale beam and centrally supporting said weighing elements.

6. A scale of the class described, comprising in combination a framework, a pair of vertically spaced spring supporting bars supported by said framework, horizontally disposed spring bands surrounding said bars, horizontally disposed beams having central support upon said bands, spring supporting bars positioned crosswise of said beams and fixedly supported by the ends thereof, horizontally disposed spring bands surrounding said bars, weighing elements, and supporting brackets for said weighing elements mounted centrally upon said beam supported springs.

7. A scale of the class described, comprising in combination a framework, a pair of vertically spaced spring supporting bars supported by said framework, said bars having upwardly projecting ends, horizontally disposed spring bands surrounding said bars and being spaced from the bars by the upwardly turned ends thereof, horizontally disposed beams having central support upon said bands, spring supporting bars positioned crosswise of said beams and fixedly supported by the ends thereof, said bars having upwardly directed ends, horizontally disposed spring bands surrounding said bars and being spaced centrally therefrom, weighing elements, and supporting means for said weighing elements centrally mounted upon said beam supported springs.

8. A scale of the class described, comprising in combination a framework, a pair of vertically spaced spring supporting bars supported by said framework, horizontally disposed spring bands surrounding said bars, horizontally disposed beams having central support upon said bands, spring supporting bars positioned crosswise of said beams and fixedly supported by the ends thereof, horizontally disposed spring bands surrounding said bars, weighing elements, supporting brackets for said weighing elements connected centrally upon said beam supported springs, and a tare rod having threaded support longitudinally of the lower of said beams, and being positioned between said beams.

CHARLES V. GLUTZ.